United States Patent
Axmann

(10) Patent No.: US 10,196,213 B2
(45) Date of Patent: Feb. 5, 2019

(54) DEVICE FOR CONVEYING AND SORTING PIECE GOODS AND METHOD FOR SORTING PIECE GOODS

(71) Applicant: Axmann Foerdersysteme GmbH, Zwenkau (DE)

(72) Inventor: Norbert Axmann, Sinsheim (DE)

(73) Assignee: Axmann Foerdersysteme GmbH, Zwenkau (DE)

( * ) Notice: Subject to any disclaimer, the term of this patent is extended or adjusted under 35 U.S.C. 154(b) by 0 days.

(21) Appl. No.: 15/618,278

(22) Filed: Jun. 9, 2017

(65) Prior Publication Data

US 2018/0016100 A1 Jan. 18, 2018

(30) Foreign Application Priority Data

Jul. 18, 2016 (DE) .......................... 10 2016 113 180

(51) Int. Cl.
*B65G 47/74* (2006.01)
*B65G 17/00* (2006.01)
(Continued)

(52) U.S. Cl.
CPC .............. *B65G 15/36* (2013.01); *B65G 13/10* (2013.01); *B65G 13/11* (2013.01); *B65G 15/42* (2013.01);
(Continued)

(58) Field of Classification Search
None
See application file for complete search history.

(56) References Cited

U.S. PATENT DOCUMENTS 4,711,341 A * 12/1987 Yu .................. B65G 47/844
198/370.02
4,884,677 A * 12/1989 Yu .................. B65G 47/844
198/370.02
(Continued)

FOREIGN PATENT DOCUMENTS

DE       601 13 098 T2   3/2006
DE   10 2014 102 873 A1   9/2015
(Continued)

OTHER PUBLICATIONS

German Examination Report dated Jul. 5, 2018 in German Application No. 10 2016 113 180.6 with English translation of the relevant parts.

*Primary Examiner* — Kavel Singh
(74) *Attorney, Agent, or Firm* — Collard & Roe, P.C.

(57) ABSTRACT

Device for conveying piece goods along a conveying path includes a sorting device for sorting piece goods, track profile members extending transversely to a track conveying direction and connected together to form an endless conveyor track with an upper and a lower run. The upper run has a conveyor surface for conveying the piece goods in the track conveying direction. Push shoes are successive along the conveying path and each is displaceable along at least one track profile member of the track profile members so as to constrainedly displace the piece goods laterally on the conveyor surface transversely to the track conveying direction of the endless conveyor track. A drive drives the endless conveyor track in the track conveying direction. Each push shoe includes a guide roller, which is arranged below the upper run and mounted to be rotatable about an axis of rotation extending transversely to the conveyor surface.

30 Claims, 7 Drawing Sheets

(51) Int. Cl.
*B65G 47/34* (2006.01)
*B65G 15/36* (2006.01)
*B65G 13/10* (2006.01)
*B65G 13/11* (2006.01)
*B65G 15/42* (2006.01)
*B65G 15/46* (2006.01)
*B65G 47/84* (2006.01)

(52) U.S. Cl.
CPC ........... *B65G 15/46* (2013.01); *B65G 47/844* (2013.01); *B65G 2207/36* (2013.01)

(56) References Cited

U.S. PATENT DOCUMENTS

| | | | |
|---|---|---|---|
| 5,038,912 A * | 8/1991 | Cotter | B65G 47/844 198/370.02 |
| 5,285,886 A | 2/1994 | Ostholt et al. | |
| 5,927,465 A | 7/1999 | Shearer, Jr. | |
| 5,967,289 A | 10/1999 | Kelsey | |
| 6,615,972 B2 | 9/2003 | Veit et al. | |
| 6,860,376 B1 * | 3/2005 | Heit | B07C 5/362 198/370.02 |

FOREIGN PATENT DOCUMENTS

| | | |
|---|---|---|
| EP | 1 283 810 B1 | 8/2005 |
| EP | 1 373 109 B1 | 6/2006 |
| EP | 1 648 803 B1 | 11/2008 |
| WO | 01/83342 A1 | 11/2001 |
| WO | 02/26602 A2 | 4/2002 |
| WO | 2005/012146 A1 | 2/2005 |

* cited by examiner

DEVICE FOR CONVEYING AND SORTING PIECE GOODS AND METHOD FOR SORTING PIECE GOODS

CROSS REFERENCE TO RELATED APPLICATIONS

Applicant claims priority under 35 U.S.C. § 119 of German Application No. 10 2016 113 180.6 filed Jul. 18, 2016, the disclosure of which is incorporated by reference.

BACKGROUND OF THE INVENTION

1. Field of the Invention

The invention relates to a device for conveying and sorting piece goods and to a method for sorting piece goods. The sorting can be carried out for the purpose of ejecting piece goods. This can be carried to one side or also to both sides of a conveying path.

2. Description of the Related Art

Sorting devices with constrained displacement of piece goods have been made known by WO 2005/012146 A1 and the parallel EP 1 648 803 B1, by WO 02/26602 A2 and the parallel EP 1 373 109 B1 as well as the German translation DE 601 21 052 T2 and by WO 01/83342 and the parallel EP 1 283 810 B1 as well as the German translation DE 601 13 098 T2, in which a plurality of slats connected together to form an endless track and a plurality of push shoes are provided, each of the push shoes being displaceable along at least one slat of the slats in order to move an item of piece goods on a conveyor surface, which is formed by the slats, laterally or transversely to the main conveying direction of the slats. Diverting arrangements in the form of diverting rails displace the push shoes laterally so as to laterally displace objects on a conveyor surface, which is defined by an upper run of the endless track. The diverting rails extend diagonally under the conveyor surface. Each push shoe contains a transmission subassembly for transmission to one of the deflecting rails when an electromagnetic actuator is actuated. The transmission subassembly includes a pilot element which consists of a magnetically permeable membrane such as, for example, an iron alloy or other ferromagnetic substance. The pilot element is selectively attracted and moved by an actuator in horizontal direction parallel to the conveyor surface, which involves an electromagnet arranged at the start of a diverting guide track. The transmission subassembly mechanically interacts with a deflecting subassembly in away which has the effect that the entire transmission subassembly follows the pilot element in the direction of the deflecting rail and ultimately contacts this, in which case the deflection of the push shoe, together with the laterally driving transmission subassembly, ends at the deflecting rail, the deflection having been initiated magnetically. In addition, the transmission subassembly and the deflecting subassembly are configured in such a way that if the actuator does not attract the pilot element the laterally driving transmission subassembly is so configured that it moves in a forward movement in correspondence with the movement direction of the conveyor surface. Deflecting subassembly and transmission subassembly form a kind of diverter. These constructions are complicated and expensive.

A device for conveying piece goods has become known from DE 10 2014 102 873 A1. This device is similarly a conveyor, which is equipped with constrained displacement shoes, for sorting piece goods. A diverter with a pivot tongue rotatable about a vertical axis of rotation arranged perpendicularly to the conveyor surface is there arranged in the region of a transition of a guide track, which extends parallel to the track conveying direction, to the diverting guide track extending diagonally with respect thereto.

The pivot tongue can be pivoted by means of a rotary magnet from a conveying setting, in which the push shoes during circulation of the endless track conveyor can pass the diverter—without deflection of the movement in the track conveying direction—in a horizontal direction parallel to the conveyor surface, into a deflection setting, in which the push shoes during circulation of the endless conveyor track are deflected by way of the respective deflecting and guide roller thereof for a movement along the diverting guide track extending diagonally to the track conveying direction.

Provided in the region of the said transition is a transfer element with comparatively narrow guide tracks serving for guidance and deflection of the deflecting and guidance roller, which is also termed small roll and which is mounted for rotation about an axis of rotation to be rotatable on a bearing pin extending perpendicularly to the conveyor surface below the upper run.

A guide roller for the push shoe is rotatably mounted on the same bearing pin, but between the said small roll and the upper run, to be rotatable about the said axis of rotation. This guide roller, which has a significantly greater outer diameter than the small roll, serves the purpose of guiding the push shoe, during circulation of the endless conveyor track in the track conveying direction, along the guide track, which extends parallel to the conveying direction, and along the diverting guide track, which extends diagonally with respect to the track conveying direction. The guide track and the diverting guide track are each formed with an upwardly open U profile. The horizontal inner spacing between the respective two U profile limbs of the respective U profile is slightly larger than the outer diameter of the guide roller so that the guide roller is guided with a small play in the U profile of the guide track or the diverting guide track.

The diversion technology known from the foregoing prior art and the guide tracks and diverting guide tracks relating thereto are extremely complicated and accordingly also susceptible to fault.

SUMMARY OF THE INVENTION

It is accordingly an object of the invention to provide a device for conveying piece goods, which is comparatively simple and robust, has longevity and is economic and by means of which sorting or ejection of piece goods is possible with a smaller or comparatively small outlay and nevertheless reliable and by means of which an advantageous method for sorting or ejection of piece goods can be realised.

This object is fulfilled preferably by a device according to the invention. Accordingly the invention relates to, in particular, a device for conveying piece goods along a conveying path, comprising a sorting device—which can also be termed constrained displacement sorting device—for sorting piece goods, and a plurality of track profile members, which extend transversely to a track conveying direction and which are connected together to form an endless conveyor track with an upper run and a lower run. The upper run of the endless conveyor track has a conveyor surface for conveying the piece goods in the track conveying direction.

The device comprises a plurality of push shoes, which are successive along the conveying path and each of which is displaceable or slides along at least one track profile member of the track profile members so as to constrainedly displace the piece goods laterally on the conveyor surface transversely to the track conveying direction of the endless conveyor track.

The device comprises in addition a drive for driving the endless conveyor track in the track conveying direction. Each push shoe comprises a guide roller, which is arranged below the upper run and rotatable about an axis of rotation, which extends transversely or perpendicularly to the conveyor surface, of a bearing body, for guidance of the push shoe, during circulation of the endless conveyor track in the track conveying direction, along at least one guide track extending parallel to the track conveying direction and/or along at least one diverting guide track extending at an inclination or diagonally to the track conveying direction. The at least one diverting guide track is formed by a first diverting guidance inclined body arranged below the upper run.

The device also comprises a first actuator for actuating the first diverting guidance inclined body. The first diverting guidance inclined body is transferrable by means of the first actuator from a first pass setting, in which the push shoes can move or move in the track conveying direction during circulation of the endless conveyor track in the track conveying direction, to a first diverting setting in order to be able to move the push shoes, during circulation of the endless conveyor track in the track conveying direction, in a first diverting direction at an inclination or diagonally to the track conveying direction along the at least one diverting guide track.

The first actuator is so arranged and constructed that it can raise the first diverting guidance inclined body from a first, lower free setting in a direction transverse or perpendicular to the conveyor surface to a first, upper diverting engagement setting.

The first diverting guidance inclined body is so mounted, preferably on a support, that the first diverting guidance inclined body is raisable and lowerable in a direction transverse or perpendicular to the conveyor surface and is transferrable by means of the first actuator from the first, lower free setting, in which the push shoes can move together with the guide rollers thereof, during circulation of the endless conveyor track in the track conveying direction, above the first diverting guidance inclined body and across the first diverting guidance inclined body in the track conveying direction, to the first, upper diverting engagement setting, in which the guide rollers of the push shoes to be diverted can or do contact, during circulation of the endless conveyor track in the track conveying direction, a first diverting guide surface of the first diverting guidance inclined body so that the push shoes to be diverted are moved, when they bear by the guide rollers thereof against the first diverting guide surface of the first diverting guidance inclined body, during circulation of the endless conveyor track in the track conveying direction, along the first diverting guide surface of the first diverting guidance inclined body in the first diverting direction at an inclination or diagonally to the track conveying direction.

According to a particularly preferred embodiment it can provided that the first diverting guidance inclined body has at its upper side facing the upper run a first recess which opens upwardly in direction towards the upper run and is formed in such a way that at least one guide roller part of the guide roller of each push shoe is receivable in the first recess. This is preferably such that when, in particular, the first diverting guidance inclined body is in a first intermediate setting between the first, lower free setting and the first, upper diverting engagement setting and when the endless conveyor track moves in the track conveying direction the guide roller part of the guide roller of each push shoe which is not to be diverted can move or moves in the track conveying direction along a first guide track, which extends in the track conveying direction, for guidance of the push shoes through the first recess of the first diverting guidance inclined body and across the first diverting guidance inclined body.

Alternatively or additionally, according to a particularly preferred variant of embodiment it can be provided that the first diverting guidance inclined body has at its upper side facing the upper run a second recess which is upwardly open in direction towards the upper run and formed in such a way that at least a guide roller part of the guide roller of each push shoe diverted by means of the first diverting guidance inclined body is receivable in the second recess. This is preferably such that when, in particular the first diverting guidance inclined body is in its first, upper diverting engagement setting and when the endless conveyor track moves in the track conveying direction the guide roller part of the guide roller of each push shoe diverted by means of the first diverting guidance inclined body can move or moves in the track conveying direction along a second guide track, which extends in the track conveying direction, for guidance of the push shoes through the second recess of the first diverting guidance inclined body and across the first diverting guidance inclined body.

According to a development it can be provided that the first recess of the first diverting guidance inclined body and the second recess of the first diverting guidance inclined body as considered in a direction inclined or diagonal with respect to the track conveying direction are arranged at a first recess spacing from one another and/or that the first guide track and the second guide track extend parallel to one another in the track conveying direction and have in the said direction a guide track spacing from one another approximately substantially corresponding with the first recess spacing.

According to a preferred development it can be provided that the first diverting guidance inclined body has a first end and a second end facing away therefrom, the first recess of the first diverting guidance inclined body is arranged at the first end of the first diverting guidance inclined body and/or the second recess of the first diverting guidance inclined body is arranged at the second end of the first diverting guidance inclined body.

According to an advantageous embodiment it can be provided that the first end of the first diverting guidance inclined body as considered in a cross-section containing a longitudinal axis of the first diverting guidance inclined body is formed to be step-shaped and/or the second end of the first diverting guidance inclined body as considered in a or the cross-section containing a longitudinal axis of the first diverting guidance inclined body is formed to be step-shaped.

According to a preferred embodiment it can be provided that the first end of the first diverting guidance inclined body has a first entry slope or entry curve for the guide rollers. Noise output and wear can thereby be minimised.

According to a particularly preferred embodiment it can be provided that the first diverting guidance inclined body in the region of one end of its ends facing away from one another or at one end of its ends facing away from another or in the region of the second end or at the second end is so articulated by means of a first pivot bearing or rotation bearing to a first support for the first diverting guidance inclined body to be either pivotable about a pivot axis, which extends parallel or at an acute angle of preferably less than 45 degrees to the conveyor surface, or rotatable about an axis of rotation, which extends parallel or at an acute angle of preferably less than 45 degrees to the conveyor surface, relative to the first support and in a direction transverse to the conveyor surface relative to the conveyor surface that the first diverting guidance inclined body is pivotable or rotatable by means of the first actuator from the first, lower free setting about the first pivot axis or about the first axis of rotation in a direction transverse or perpendicular to the conveyor surface to the first, upper diverting engagement setting.

According to an advantageous embodiment it can be provided that the at least one diverting guide track is formed by a second diverting guidance inclined body arranged below the upper run and that either a second actuator for actuation of the second diverting guidance inclined body is provided.

The second diverting guidance inclined body is transferrable by means of the second actuator from a second pass setting in which the push shoes, during circulation of the endless conveyor track in the track conveying direction, can move in the track conveying direction to a second diverting setting in order to be able to move the push shoes, during circulation of the endless conveyor track in the track conveying direction, in a second diverting direction at an inclination or diagonally to the track conveying direction along the at least one diverting guide track.

The second actuator is so arranged and constructed that it can raise the second diverting guidance inclined body from a second, lower free setting in a direction transverse or perpendicular to the conveyor surface to a second, upper diverting engagement setting, or the first actuator also serves for actuation of the second diverting guidance inclined body.

The second diverting guidance inclined body is so mounted, preferably on a support, that it is raisable and lowerable in a direction transverse or perpendicular to the conveyor surface and is transferrable by means of the first or second actuator from the second, lower free setting, in which the push shoes together with the guide rollers thereof, during circulation of the endless conveyor track in the track conveying direction, can move above the second diverting guidance inclined body and across the second diverting guidance inclined body in the track conveying direction to the second, upper diverting engagement setting, in which the guide rollers of the push shoes to be diverted, during circulation of the endless conveyor track in the track conveying direction, can or do contact a second diverting guide surface of the second diverting guidance inclined body so that the push shoes to be diverted are moved, when they bear by the guide rollers thereof against the second diverting guide surface of the second diverting guidance inclined body, during circulation of the endless conveyor track in the track conveying direction, along the second diverting guide surface of the second diverting guidance inclined body in the second diverting direction at an inclination or diagonally to the track conveying direction.

According to a preferred development it can be provided that the second diverting guidance inclined body has at the upper side thereof facing the upper run a third recess which is upwardly open in direction towards the upper run and which is so formed that at least a guide roller part of the guide roller of each push shoe is receivable in the third recess. This is preferably such that when, in particular, the second diverting guidance inclined body is in, especially, a second intermediate setting between the second, lower free setting and the second, upper diverting engagement setting and when the endless conveyor track moves in the track conveying direction the guide roller part of the guide roller of each push shoe not to be diverted can move or moves in the track conveying direction along the first guide path, which extends in the track conveying direction, for guidance of the push shoes through the third recess of the second diverting guidance inclined body and across the second diverting guidance inclined body.

Alternatively or additionally, according to a particularly preferred embodiment it can be provided that the second diverting guidance inclined body at the upper side thereof facing the upper run has a fourth recess which is upwardly open in direction towards the upper run and is so formed that at least a guide roller part of the guide roller of each push shoe diverted by means of the second diverting guidance inclined body is receivable in the fourth recess. This is preferably such that when, in particular, the second diverting guidance inclined body is in its second, upper diverting engagement setting and when the endless conveyor track moves in the track conveying direction the guide roller part of the guide roller of each push shoe diverted by means of the second diverting guidance inclined body can move or moves in the track conveying direction along the second guide track, which extends in the track conveying direction, preferably parallel to the first guide track, for guidance of the push shoes through the fourth recess of the second diverting guidance inclined body and across the second diverting guidance inclined body.

According to a development it can be provided that the third recess of the second diverting guidance inclined body and the fourth recess of the second diverting guidance inclined body as considered in a direction inclined or diagonal with respect to the track conveying direction are arranged at a second recess spacing from one another and/or that the first guide track and the second guide track extend parallel to one another in the track conveying direction and have in the said direction a guide track spacing from one another corresponding with the second recess spacing.

According to a preferred variant it can be provided that the second diverting guidance inclined body has a first end and a second end facing away therefrom, the third recess of the second diverting guidance inclined body is arranged at the first end of the second diverting guidance inclined body and/or the fourth recess of the second diverting guidance inclined body is arranged at the second end of the second diverting guidance inclined body.

According to an advantageous embodiment it can be provided that the first end of the second diverting guidance inclined body as considered in a cross-section containing a longitudinal axis of the second diverting guidance inclined body is formed to be step-shaped and/or the second end of the second diverting guidance inclined body as considered in a cross-section containing a longitudinal axis of the second diverting guidance inclined body is formed to be step-shaped.

According to a preferred embodiment it can be provided that the first end of the second diverting guidance inclined body has a second entry slope or entry curve for the guide rollers. Noise output and wear can thereby be minimised.

According to a particularly preferred embodiment it can be provided that the second diverting guidance inclined body in the region of one end of its ends facing away from one another or at one end of its ends facing away from one another or in the region of the second end or at the second end is so articulated by means of a second pivot bearing or rotation bearing to a second support for the second diverting guidance inclined body to be either pivotable about a pivot axis, which extends parallel or at an acute angle of preferably less than 45 degrees to the conveyor surface, or about an axis of rotation, which extends parallel or at an acute angle preferably less than 45 degrees to the conveyor surface, relative to the second support and in a direction transverse or perpendicular to the conveyor surface relative to the conveyor surface that the second diverting guidance inclined body is pivotable or rotatable by means of the second actuator from the second, lower free setting about the second pivot axis or about the second axis of rotation in a direction transverse or perpendicular to the conveyor surface to the second, upper diverting engagement setting.

According to a preferred development it can be provided that the first diverting guidance inclined body and/or the second diverting guidance inclined body is or are arranged at an angle to the track conveying direction, the angle being 45 degrees or smaller than approximately 45 degrees or being approximately 30 degrees.

Further, it can be provided that the first diverting guidance inclined body and the second diverting guidance inclined body are so arranged that they enable diversion or ejection of piece goods towards the same side of the endless conveyor track or that they enable diversion or ejection of piece goods towards, as considered in a direction transverse or perpendicular to the track conveying direction, sides of the endless conveyor track facing away from one another.

According to an embodiment it can be provided that the first diverting guidance inclined body and the second diverting guidance inclined body are arranged to be parallel and at a spacing one behind the other as considered in the track conveying direction.

In particular, it can be provided that the first diverting guidance inclined body and the second diverting guidance inclined body are coupled with a common support which together with the first diverting guidance inclined body and the second diverting guidance inclined body is at least raisable, preferably also lowerable, by means of the first actuator so as to enable or cause parallel diversion or parallel ejection of piece goods on one side.

According to an alternative embodiment it can be provided that the first diverting guidance inclined body and the second diverting guidance inclined body are arranged to cross and thereby form a crossing region and in such a way that they enable diversion or ejection of piece goods towards, as considered in a direction transverse or perpendicular to the track conveying direction, sides of the endless conveyor track facing away from one another.

In that case, according to a particularly preferred development it is provided that the first diverting guidance inclined body in the crossing region has a first receiving recess which is preferably upwardly open and in which a part of the second diverting guidance inclined body is received to be raisable and lowerable relative to the first diverting guidance inclined body or that the second diverting guidance inclined body in the crossing region has a second receiving recess which is preferably upwardly open and in which a part of the first diverting guidance inclined body is received to be raisable and lowerable relative to the second diverting guidance inclined body.

According to a particularly preferred embodiment it can be provided that the first actuator comprises a first first actuator and a second first actuator actuable independently of one another, wherein an actuator part of the first first actuator is actuable in a first lower end position and in a first upper end position, the end position spacing of which corresponds with a first total stroke of the first first actuator, wherein an actuator part of the second first actuator is actuable in a second lower end position and in a second upper end position, the end position spacing of which corresponds with a second total stroke of the second first actuator, and wherein the first first actuator and the second first actuator are so coupled together that the first lower free setting is achieved in the first upper end position of the actuator part of the first first actuator in combination with the first lower end position of the actuator part of the second first actuator, that the first upper diverting engagement setting is achieved in the first lower end position of the actuator part of the first first actuator in combination with the first upper end position of the actuator part of the second first actuator and that the first intermediate setting is achieved either in the first lower end position of the actuator part of the first first actuator in combination with the second lower end position of the actuator part of the second first actuator or in the first upper end position of the actuator part of the first first actuator in combination with the second upper end position of the actuator part of the second first actuator and/or that the second actuator comprises a first second actuator and a second second actuator actuable independently of one another, wherein an actuator part of the first second actuator is actuable in a first lower end position and in a first upper end position, the end position spacing of which corresponds with a first total stroke of the first second actuator, wherein an actuator part of the second second actuator is actuable in a second lower end position and in a second upper end position, the end position spacing of which corresponds with a second total stroke of the second second actuator, and wherein the first second actuator and the second second actuator are so coupled together that the second lower free setting is achieved in the second upper end position of the actuator part of the first second actuator in combination with the second lower end position of the actuator part of the second second actuator, that the second upper diverting engagement setting is achieved in the second lower end position of the actuator part of the first second actuator in combination with the second upper end position of the actuator part of the second second actuator and that the second intermediate setting is achieved either in the second lower end position of the actuator part of the first second actuator in combination with the second lower end position of the actuator part of the second second actuator or in the second upper end position of the actuator part of the first second actuator in combination with the second upper end position of the actuator part of the second second actuator. A particularly fast and operationally reliable functioning is achieved by this comparatively simple construction.

According to a preferred development it can be provided that the endless conveyor track as considered in a direction perpendicular to the track conveying direction has a width and that the first diverting guide body has a first length and/or that the second diverting guide body has a second length, each length corresponding with at least half or at least two-thirds of the width of the endless conveyor track.

According to a particularly preferred embodiment it can be provided that the first diverting guidance inclined body is constructed as an elongate inclined strip which preferably extends substantially rectilinearly transversely to the track conveying direction or in the direction of its longitudinal axis, and/or that the second diverting guidance inclined body is constructed as an elongate inclined strip, which preferably extends substantially rectilinearly transversely to the track conveying direction or in the direction of its longitudinal axis.

According to an advantageous development it can be provided that as first and/or second actuator use can be made of, in particular, a piston-cylinder unit, especially a pneumatic piston-cylinder unit or a pneumatic cylinder or a magnet, particularly an electromagnet, or a motor, particularly an electric motor.

The invention preferably also relates to a method of sorting piece goods by means of the sorting device or constrained displacement sorting device of the device for conveying piece goods according to the invention, wherein the endless conveyor track driven by the drive circulates in the path conveying direction, wherein at least one item of piece goods rests on the conveyor surface so that the at least one item of piece goods and a plurality of the push shoes successive along the conveying path are moved in the track conveying direction, wherein for diversion or ejection of the at least one item of piece goods in the first or second diverting direction the first or second diverting guidance inclined body is moved by means of the first or second actuator from the first or second lower free setting to the first or second upper diverting engagement setting, whereupon the guide rollers of the push shoes to be diverted come into contact with the first or second diverting guide surface of the first or second diverting guidance inclined body so that then each guide roller, which bears against the first or second diverting guide surface of the first or second diverting guidance inclined body, of the respective push shoe is moved, during circulation of the endless conveyor track in the track conveying direction, along the first or second diverting guide surface of the first or second diverting guidance inclined body in the first or second diverting direction at an inclination or diagonally to the track conveying direction, whereby a constrained displacement of the respective push shoe and as a consequence also a constrained displacement of the at least one item of piece goods by means of the respective push shoe transversely to the track conveying direction is achieved.

In that case it can be provided that the first or second diverting guidance inclined body in the region of one end of its ends facing away from one another or at one end of its ends facing away from one another is articulated by means of a first or second pivot bearing or rotation bearing to a first or second support for the first or second diverting guidance inclined body to be either pivotable about a first or second pivot axis, which extends parallel or at an acute angle, preferably of less than 45 degrees, to the conveyor surface, or rotatable about a first or second axis of rotation, which extends parallel or at an acute angle, preferably of less than 45 degrees, to the conveyor surface, relative to the first or second support and in a direction transverse to the conveyor surface relative to the conveyor surface and that the first or second diverting guidance inclined body is pivoted or rotated by means of the first or second actuator from the first or second, lower free setting about the first or second pivot axis or about the first or second axis of rotation in a direction transverse to the conveyor surface to the first or second, upper diverting engagement setting.

For preference the first or second first diverting guidance inclined body has at the upper side thereof facing the upper run not only a first recess, but also a second recess which as considered in a direction inclined or diagonal with respect to the track conveying direction are arranged at a first or second recess spacing from one another and which are each upwardly open in direction towards the upper run and formed in such a way that at least a guide roller part of the guide roller of each push shoe is receivable in the first recess and in the second recess and that as soon as the guide roller part of a guide roller of a diverted push shoe has arrived in the second recess so that then this guide roller part can move in the track conveying direction through the second recess and across the first diverting guidance inclined body along the second guide track the first or second diverting guidance inclined body is so lowered by means of the first or second actuator or by means of at least one further actuator or under gravitational force into a first or second intermediate setting between the first or second, upper diverting engagement setting and the first or second, lower free setting that the guide rollers, which still bear against the first or second diverting guide surface of the first or second diverting guidance inclined body, of the push shoe to be diverted are moved, during circulation of the endless conveyor track in the conveying direction, further along the first or second diverting guide surface of the first or second diverting guidance inclined body at an inclination or diagonally with respect to the track conveying direction, whilst at the same time the guide roller of at least one further push shoe, which is moved in the track conveying direction along the first guide track, and which impinges on the first or second diverting guidance inclined body, is already further moved in the track conveying direction along the first guide track through the first recess and across the first or second diverting guidance inclined body. Accordingly, this at least one further push shoe can pass the diverting guidance inclined body without hindrance by that.

In accordance with an advantageous variant of embodiment of the device according to the invention and/or in accordance with an advantageous development of the method according to the invention it can be provided that the at least one item of piece goods to be sorted or to be diverted or ejected has a defined piece goods length and that the sorting device or constrained displacement sorting device is so controlled in dependence on the piece goods length of the at least one item of piece goods that by means of the first or second diverting guidance inclined body a defined number of the push shoes is constrainedly laterally displaced transversely to the track conveying direction.

The diverting guidance inclined bodies can be raisable, preferably also lowerable again, or raised, preferably also lowered again, individually or in a group or in a plurality of groups by means of an actuator or by means of a plurality of actuators.

It will be evident that the expert can combine the preceding features and measures as well as the features and measures evident from the claims and the drawings as desired within the scope of feasibility.

BRIEF DESCRIPTION OF THE DRAWINGS

Other objects, advantages, features, details and aspects of the invention will become apparent from the following detailed description considered in connection with the accompanying drawings in which preferred embodiments of the invention are described. It is to be understood, however, that the drawings are designed as an illustration only and not as a definition of the limits of the invention.

In the drawings.

DETAILED DESCRIPTION OF PREFERRED EMBODIMENTS

Figure 1:
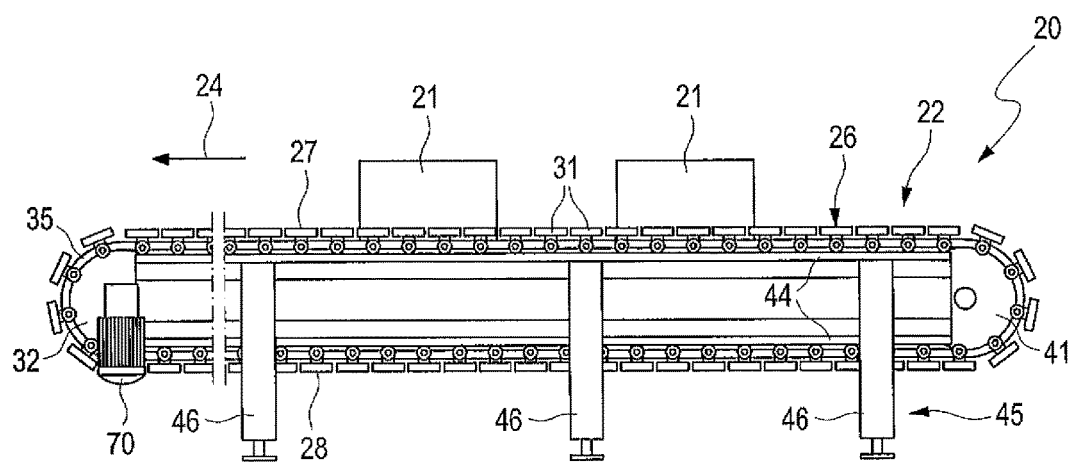
FIG. 1 shows a sorting conveyor in a side view.

FIG. 1 shows a construction as an entire conveyor in the form of a device 20 according to the invention for conveying piece goods 21, such as packages or packets, along a conveying path 22. The device 20 comprises at least one constrained displacement sorting device 23 for sorting or ejecting the piece goods 21. The device 20 comprises a plurality of track profile members 25, which can also be termed transverse profile members and which extend transversely to a track conveying direction 24, which can also be termed main conveying direction. The track profile members 25 are connected together to form an endless conveyor track 26 with an upper run 27 and a lower run 28. The upper run 28 has a conveyor surface 29, which is formed by outer surfaces of the track profile members 25, for conveying the piece goods 21 in the track conveying direction 24 and also transversely to the track conveying direction 24. The device 20 or the constrained-displacement sorting device 23 thereof has a plurality of push shoes 31 arranged in succession along the conveying path 22. Each push shoe 31 is displaceable along a track profile member 25 of the track profile members 25 or slides on a track profile member 25 of the track profile members 25 so as to constrainedly laterally displace the piece goods 21 on the conveyor surface 29 transversely to the track conveying direction 24 of the endless conveyor track 26. The device 20 additionally comprises a drive 32 for driving the endless conveyor track 26 in the track conveying direction 24.

Each push shoe 31 comprises a guide roller 53, which is arranged below the upper run 27, for guidance of the push shoe 31, during circulation of the endless conveyor track 26 in the track conveying direction 24, along at least one guide track 51.1, 51.2, which extends parallel to the track conveying direction 24, and along at least one diverting guide track 52.1, 52.2, 52.3, which extends at an inclination or diagonally with respect to the track conveying direction 24. The guide roller 53 is mounted on a bearing body 34 to be rotatable about an axis 54 of rotation extending transversely or perpendicularly to the conveyor surface 29.

The at least one diverting guide track 52.1, 52.2, 52.3 is formed by a diverting guidance inclined body 9; 9.1, 9.2 arranged below the upper run 27. An actuator 12; 12.1, 12.2 for actuating the diverting guidance inclined body 9; 9.1, 9.2 is secured to a support 10.1, 10.2 of the frame 45. The diverting guidance inclined body 9; 9.1, 9.2 is transferrable by means of the actuator 12; 12.1, 12.2 from a first, pass setting 13; 13.1, 13.2, in which the push shoes 31 during circulation of the endless conveyor track 26 in the track conveying direction 24 can move in the track conveying direction 124, to a diverting setting 14; 14.1, 14.2 so as to be able to move the push shoes 31, during circulation of the endless conveyor track 26 in the track conveying direction 24, in a diverting direction 16; 16.1, 16.2 at an inclination or diagonally with respect to the track conveying direction 24 along the at least one diverting guide track 52.

According to the invention the diverting guidance inclined body 9; 9.1, 9.2 is so mounted on a support 10.1, 10.2 that the diverting guidance inclined body 9; 9.1, 9.2 is raisable and lowerable transversely or perpendicularly to the conveyor surface 29 and is movable by means of the actuator 12; 12.1, 12.2 from a lower, free setting 13; 13.1, 13.2, in which the push shoes 31 together with the guide rollers 53 thereof can move, during circulation of the endless conveyor track 26 in the track conveying direction 24, above the first diverting guidance inclined body 9; 9.1, 9.2 and across the diverting guidance inclined body 9; 9.1, 9.2 in the track conveying direction 24, to an upper diverting engagement setting 14; 14.1, 14.2, in which the guide rollers 53 of the push shoes 31, which are to be diverted, during circulation of the endless conveyor track 26 in the track conveying direction 24 can or do contact a diverting guide surface 11; 11.1, 11.2 of the diverting guidance inclined body 9; 9.1, 9.2 so that the push shoes 31 to be diverted, when they bear by the guide rollers 53 thereof against the diverting guide surface 11; 11.1, 11.2 of the diverting guidance inclined body 9; 9.1, 9.2, are moved, during circulation of the endless conveyor track 26 in the track conveying direction 24, along the diverting guide surface 11; 11.1, 11.2 of the diverting guidance inclined body 9; 9.1, 9.2 in the diverting direction 16; 16.1, 16.2 at an inclination or diagonally with respect to the track conveying direction 24.

The or each diverting guidance inclined body 9; 9.1, 9.2 is constructed as an elongate inclined strip which extends along a longitudinal axis and which is also termed blade. Each inclined strip 9; 9.1, 9.2 extends at an inclination or diagonally with respect to the rack conveying direction 24 at an angle to the track conveying direction. In the illustrated embodiments the angle is 45 degrees. In the direction in which each inclined strip 9; 9.1, 9.2 extends at an inclination or diagonally with respect to the strip conveying direction 24 each inclined strip 9; 9.1, 9.2 extends substantially rectilinearly. Each inclined strip 9; 9.1, 9.2 has a first end 17; 17.1, 18.1 and a second end 18; 17.2, 18.2 facing away therefrom in an opposite direction. Each inclined strip 9; 9.1, 9.2 is articulated at one end 17.2; 18, 18.2 of its ends to a support 10.1, 10.2 by means of a rotary bearing 19; 19.1, 19.2. Each inclined strip 9; 9.1, 9.2 is articulated to a support 10.1, 10.2 to be pivotable or rotatable about an axis 42; 42.1, 42.2 of rotation, which extends approximately parallel to the conveyor surface 29, of the rotary bearing 19; 19.1, 19.2 relative the support 10.1, 10.2 and, in a direction transverse to the conveyor surface 29, relative to the conveyor surface 29. Each inclined strip 9; 9.1, 9.2 can be pivoted or rotated by means of at least one actuator 12; 12.1, 12.2 from a lower, free setting 13; 13.1, 13.2 about the axis 42; 42.1, 42.2 of rotation in a direction transverse to the conveyor surface 29 to an upper, diverting engagement setting 14; 14.1, 14.2 and raised at one end in this mode and manner.

Each inclined strip 9; 9.1, 9.2 has at the upper side thereof, which faces the upper run 27, two respective upwardly open recesses 55.1, 55.2; 56.1, 56.2, wherein a first recess 55.1, 56.1 of the recesses is arranged at a first end of the respective inclined strip 9; 9.1, 9.2 and wherein a second recess 55.2, 56.2 of the recesses is arranged at a second end, which faces away from the first end, of the inclined strip 9; 9.1, 9.2. The first recess 55.1, 56.1 and the second recess 55.2, 56.2 of each inclined strip 9; 9.1, 9.2 are arranged at a recess spacing 59; 59.1, 59.2 from one another. For preference, the first recess 55.1, 56.1 and/or the second recess 55.2, 56.2 of each inclined strip 9; 9.1, 9.2 is or are constructed to be step-shaped or formed with a step as considered in a cross-section containing the longitudinal axis of the respective inclined strip 9; 9.1, 9.2.

Figure 16:
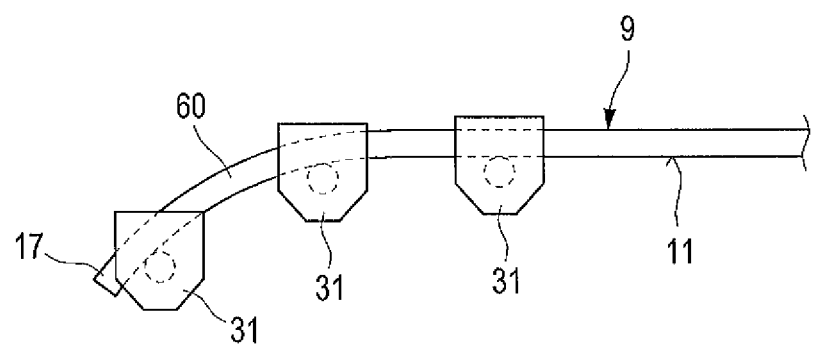
FIG. 16 shows a schematic view of an inclined strip provided with an entry slope or entry curve for the guide rollers of the push shoes.

As illustrated in FIG. 16, each inclined strip 9 can be provided at the first end 17 thereof, which faces away from the second end articulated at the respective rotary bearing 19, with an entry slope or entry curve 60.

Figure 2:
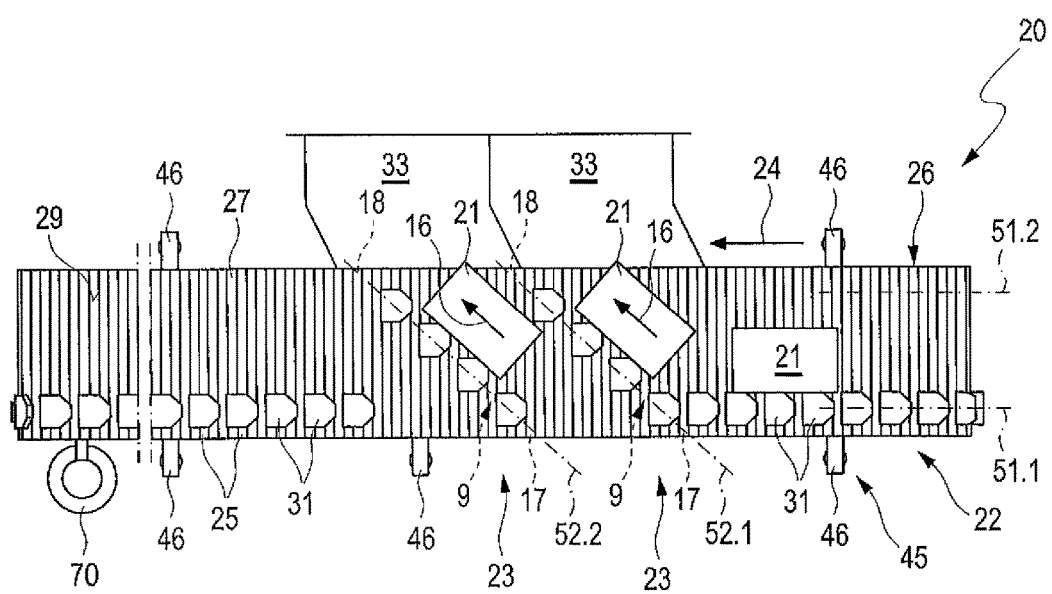
FIG. 2 shows a sorting conveyor with an ejection capability on one side, in a plan view.
Figure 3:
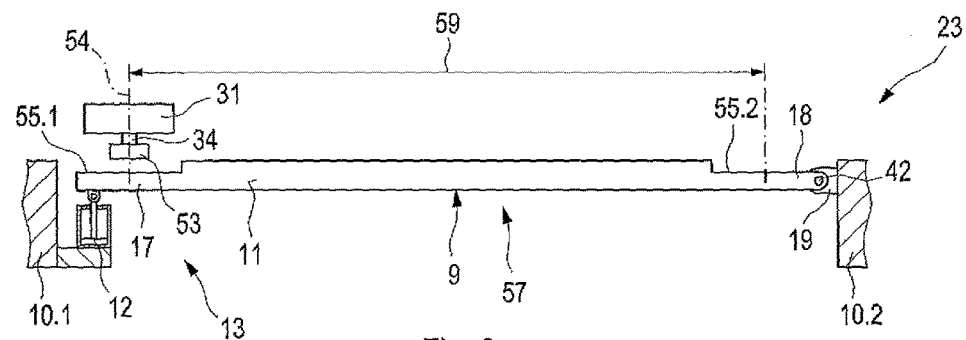
FIG. 3 shows a substantially simplified cross-section in the region of the upper run of the endless conveyor track of the sorting conveyor, wherein the illustrated inclined strip is disposed in its lower, free setting in which the push shoes, of which one push shoe is shown, are moved in the track conveying direction, during circulation of the endless track conveyor in the track conveying direction, without collision with the inclined strip through a first recess of the inclined strip and past the inclined strip.
Figure 4:
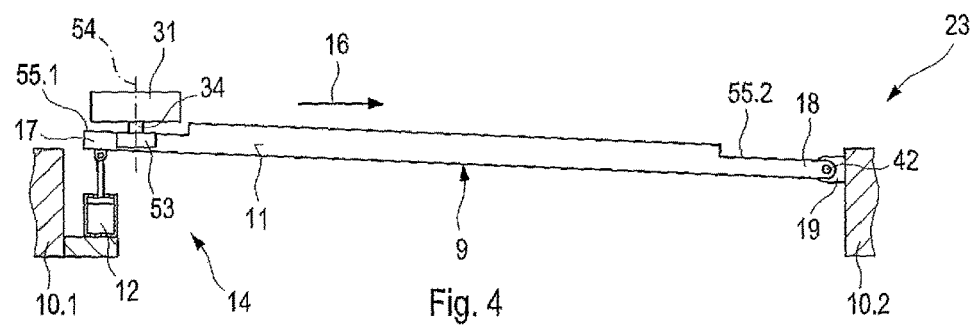
FIG. 4 shows a substantially simplified cross-section in the region of the upper run of the endless conveyor track of the sorting conveyor, wherein the inclined strip is now disposed in its upper diverting engagement setting, in which during circulation of the endless conveyor track in the track conveying direction a first push shoe comes into contact by its guide roller with the inclined strip, so that the push shoe during further movement of the endless conveyor track in the track conveying direction is moved along the inclined strip in the diverting direction characterised by an arrow.

In FIG. 2 there is shown an embodiment in which two inclined strip 9 are arranged in parallel and one behind the other at a spacing as considered in the strip conveying direction 24. Each of these two inclined strips 9 is movable by means of at least one respective actuator 12 independently of the other from a lower, free setting 13 to an upper, diverting engagement setting 14 and conversely. The two inclined strips 9 are articulated at the second end thereof 18 on the same side of the endless conveyor track 26 by means of a respective rotary bearing to be rotatable about the axis of rotation thereof. In this mode and manner the two inclined strips in this embodiment enable diversion or sorting or ejection of piece goods 21 on one side, thus towards the same side of the endless conveyor track 26, for example to the destination positions 33 as shown.

Figure 7:
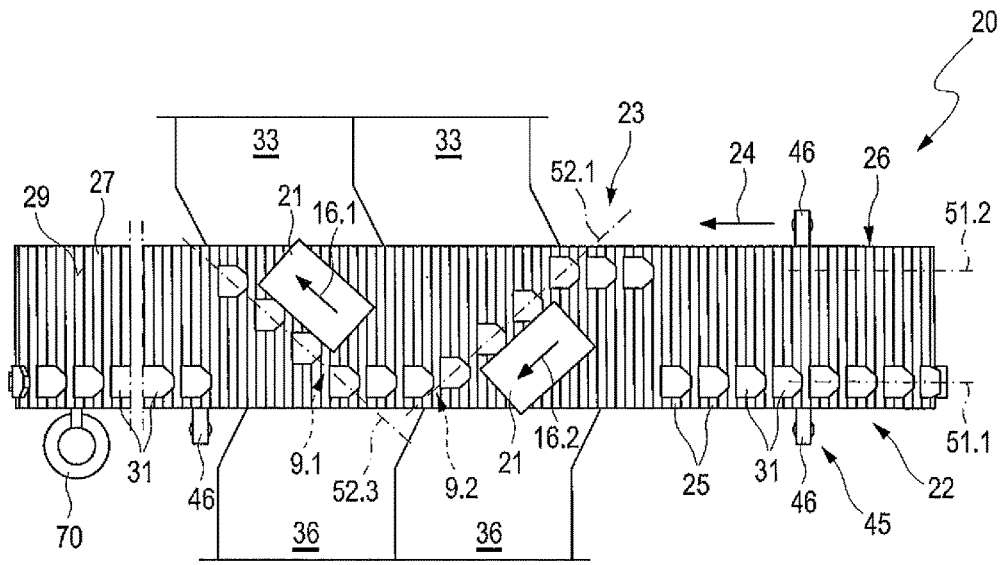
FIG. 7 shows a second embodiment of a sorting conveyor with ejection possibilities on both sides, in a simplified plan view.

In order to also make possible diversion or sorting or ejection on two sides or both sides at least two inclined strips 9.1, 9.2, for example as provided in the embodiment shown in FIG. 7, can be so arranged that the longitudinal axes thereof include an angle with respect to one another and that a first inclined strip 9.1 of the inclined strips 9.1, 9.2 is articulated by one of its ends to a first rotary bearing to be rotatable about the axis of rotation thereof, which bearing is attached in the region of a first side of the endless conveyor track 26 to a support 10.2, whilst a second inclined strip 9.2 of the inclined strips 9.1, 9.2 is articulated by one of its ends to a second rotary bearing to be rotatable about the axis of rotation thereof, which bearing is attached in the region of a second side, which faces away from the first side in a direction transverse or perpendicular to the track conveying direction 24, of the endless conveyor track 26 to a support 10.1. In this embodiment, piece goods 21 can thus be selectably ejected towards the said first side, for example towards the destination position 36, or towards the said second side, for example towards the destination position 33.

Figure 9:
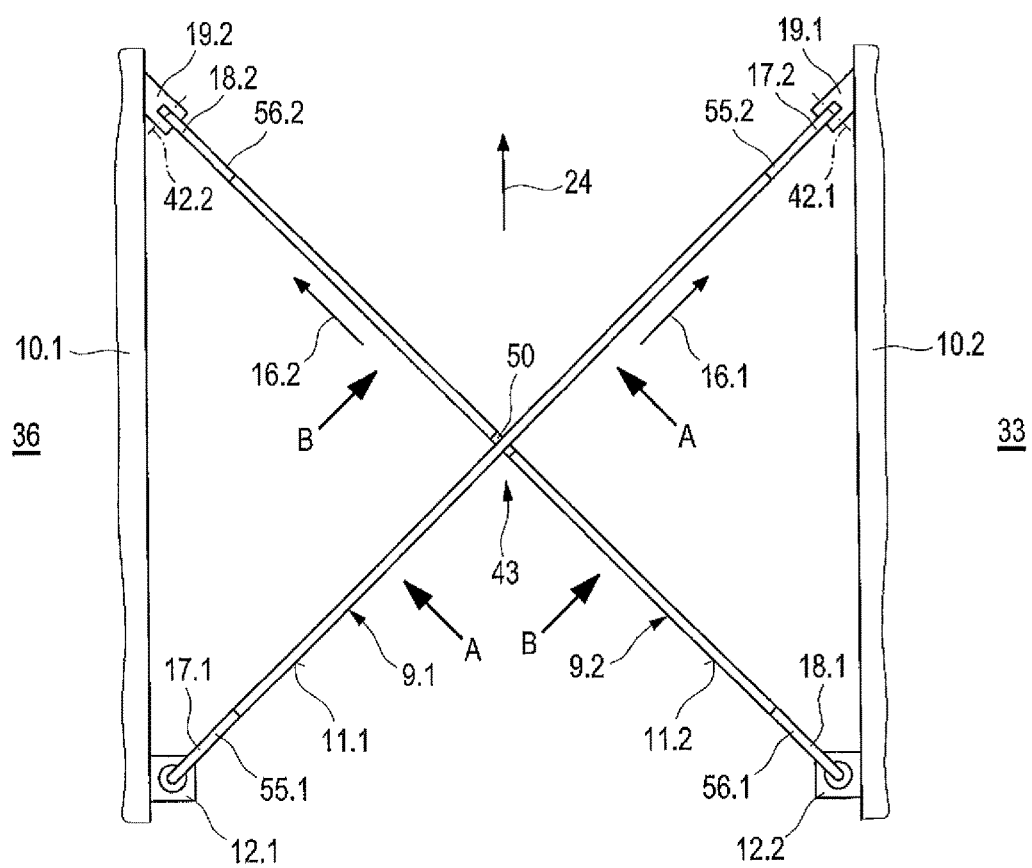
FIG. 9 shows a detail of a third embodiment of a sorting conveyor with an ejection possibility on both sides with two inclined strips arranged to cross, wherein a first inclined strip and a second inclined strip are provided and wherein the latter is provided with a receiving recess for the first inclined strip, in plan view.
Figure 10:
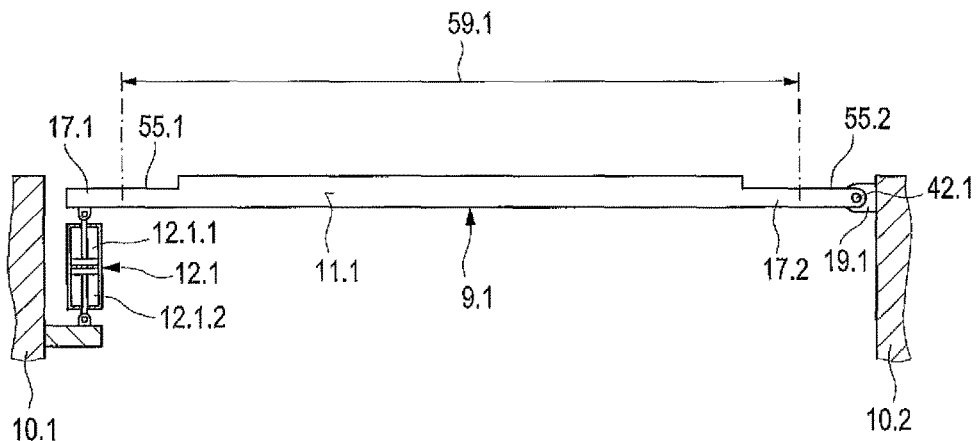
FIG. 10 shows a simplified view as considered in the direction of the arrows A-A in FIG. 9, with illustration of the first inclined strip.
Figure 11:
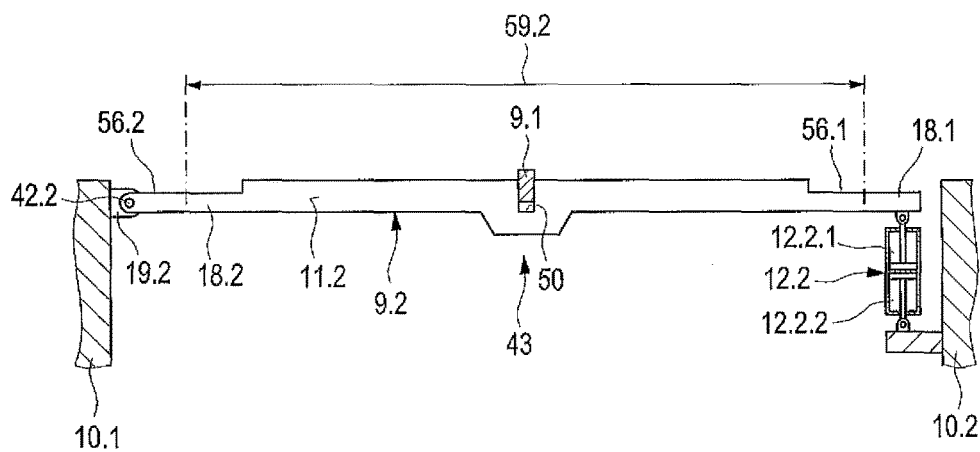
FIG. 11 shows a simplified view as considered in the direction of the arrows B-B in FIG. 9, with illustration of the second inclined strip.

A further embodiment of a device according to the invention is shown in FIGS. 9 to 11. In this embodiment, again two inclined strips 9.1, 9.2 are provided, which are each articulated to a carrier 10.2, 10.1 at one of their ends 17.2, 18.2 by means of a rotary bearing 19.1, 19.2 to be rotatable about the axis 42.1, 42.2 of rotation thereof. One rotary bearing 19.1 is again arranged in the region of a first side of the endless conveyor track 26 and the other rotary bearing 19.2 in the region of a side of the endless conveyor track 26 facing away from the first side, so as to enable diversion or sorting or ejection of piece goods 21 on both sides. However, in this embodiment the two inclined strips 9.1, 9.2 are arranged to cross thereby to form a central crossing region 43. For that purpose, the second inclined strip 9.2 of the two inclined strips 9.1, 9.2 has approximately in the longitudinal centre thereof a preferably upwardly open receiving recess 50 which is open towards the sides of the second inclined strip 9.2 facing away from one another and in which a part of the other, first inclined strip 9.1 is received to be raisable and lowerable relative to the second inclined strip 9.2.

Figure 15:
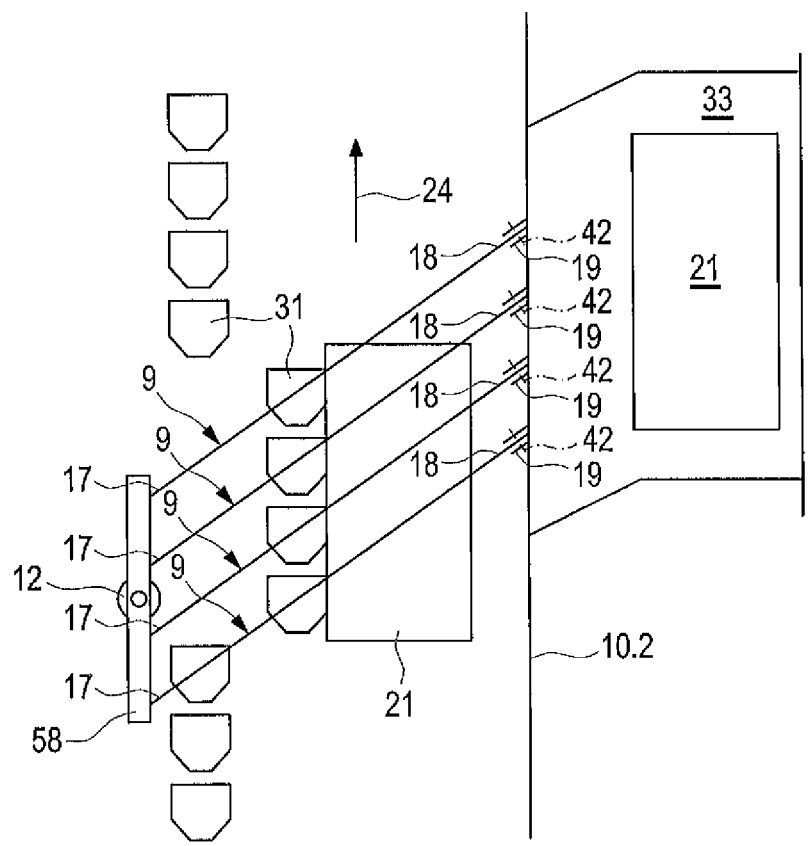
FIG. 15 shows a detail of a fourth embodiment of a sorting conveyor with an ejection possibility on one side, with four inclined strips, which are arranged in parallel and as considered in the conveying direction in succession at a spacing from one another in the track conveying direction and which are raisable and lowerable in common by way of a cross member by means of a stroke cylinder coupled therewith so as to be able to achieve parallel movement of four push shoes parallel to the track conveying direction, in a simplified plan view.

A further embodiment of a device according to the invention is shown in FIG. 15. There, in total four inclined strips 9 are arranged parallelly and one behind the other at a mutual spacing as considered in the track conveying direction 24. Each of these inclined strips 9 is articulated at one of the ends 18 thereof by way of a rotary bearing 19, to be rotatable about the axis 42 of rotation thereof, to a support 10.2 in the region of the same side of the endless conveyor track 26. The respective other end 17 of the inclined strips 9 is so coupled with a cross member 58, which extends in the track conveying direction 24 and which is also termed support, that raising or lowering of the cross member 58 by means of an actuator 12 leads at the same time to raising or lowering at one side by pivotation of the inclined strips 9 about the axes 42 of rotation of the rotary bearings 19 thereof. As a result, several push shoes 31 can be moved simultaneously in a push shoe arrangement in which the individual push shoes 31 aligned parallelly to the track conveying direction 24 are displaced by means of the respective inclined strip 9 in the direction of a destination location 33. Parallel ejection of piece goods 31 on one side is thus made possible in this special mode and manner.

For preference, the following measures can be undertaken: The profile members 25 can be fastened to two rubber chains 35, which can also be termed endless rubber drive chains, and carried by these. Each rubber chain 35 can be reinforced by at least one endless tensile element, for example in the form of at least one steel stranded cable. Each rubber chain 35 can be reinforced therein by three steel stranded cables, which can be arranged at a spacing from and parallel to one another in a notional plane extending parallel to the conveyor surface 29.

The two rubber chains 35 can preferably be fastened below the track profile members 25 in the region of the respective ends thereof facing away from one another. The two rubber chains 35 can extend in the track conveying direction 24 parallelly to one another at a transverse spacing approximately corresponding with the length of the track profile members 25.

A component, preferably an injection-moulded part, particularly of plastics material, can serve as connecting member for connection of each profile member 25 with the rubber chain 35.

The rubber chain 35 can be provided with bores through each of which a respective screw can extend. A roller 40 can be mounted on each screw to be rotatable about a horizontal axis of rotation. Each profile member 25 can be securely mounted on the respective rubber chain 35 by way of the said component.

Each rubber chain 35 can be received on two gearwheels 32, 41 each serving as a deflecting wheel. The rubber chain 35 can be mechanically positively driven by way of at least one gearwheel 32 which serves as deflecting wheel and which is also termed drive.

At least one gearwheel 32 can usually be driven by means of a geared motor 70. In order to be able to drive the rubber chain 35 by means of the at least one gearwheel 32, the rubber chain 35 can have suitable recesses for reception of teeth of the gearwheel 32. The rollers 40, which can each be connected by way of a respective screw with the said component and with the rubber chain 35, can be mounted at defined spacings as considered in track conveying direction.

The endless conveyor track 26 formed by the track profile members 25 rolls by way of the rollers 40, which are mounted at defined spacings, on parallel frame beams 44, also termed support beams, of a frame or structure 45 standing on supports 46 (see FIGS. 1 and 2). The conveyor is supplemented by horizontally mounted rollers which are not shown in more detail and which are rotatable about vertical axes of rotation. These rollers ensure, in particular, true tracking particularly in the case of comparatively lengthy conveyors.

The track profile members 25 can have different forms. For example, track profile members 25 with a rectangular cross-section can be used. However, it will be obvious that track profile members with a quadrangular cross-section can also be used. In addition, use can also be made of track profile members which are formed to be round or rounded at least on one side. The last-mentioned form of embodiment, in particular, allows transport of small piece goods and use of small deflecting rollers or gearwheels, which thus have correspondingly small effective deflection radii.

The number of push shoes 31 needed for a sorting or ejection process is determined by way of suitable electronic elements (not shown).

The invention can also be described with reference to the figures as follows:

Profile members 25 form the endless conveyor track 26 and form displacing elements for shoes 31. The shoes 31 are secured on the profile members 25 to be slidingly displaceable relative thereto and each have below the conveying path 22 or below the upper run 27 of the endless conveyor track 26 a respective, preferably ball-mounted, guide roller 53. The conveyor 20 comprises a drive unit 32 and a circulation station 41 and is driven by a geared motor 70.

Piece goods 21 and the supports 46 of the conveyor 20 are also schematically shown here. Also to be seen is the blade 9, which is also termed diverting guidance inclined body and inclined strip, by which the shoes 31 are laterally displaced.

FIGS. 3 to 6 show the principle of the sorting or ejection technology. The inclined strip 9 is here schematically illustrated, without accessories, in a cross-section through the conveyor 20. It is significant that the blade 9 is secured below the upper guide track 27, also termed upper run, at an angle of most 45° or also 30° with respect to the track conveying direction 24. The blade 9 is pivotably mounted at one end, thus at one end 18 of its ends 17, 18 facing away from one another, by means of a bearing block 19. A pneumatic cylinder 12, also termed actuator, or an electrical stroke magnet is secured to the blade 9 at its other end 17. The blade 9 has a recess 55.1, 55.2 at the two ends 17, 18.

Also to be seen is the shoe 31, which engages around the profile member 25 and in the lower region below the track 27 carries a roller 53. The roller 53 is preferably robust and ball-mounted. The roller 53 is preferably coated with a coating such as rubber or polyurethane.

Figure 5:
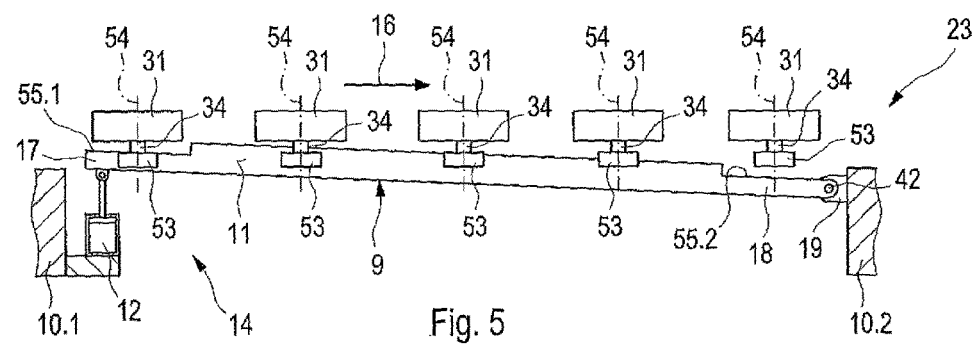
FIG. 5 shows a substantially simplified cross-section in the region of the upper run of the endless conveyor track of the sorting conveyor, wherein the illustrated inclined strip as before is disposed in its upper diverting engagement setting, wherein now a specific number of push shoes with the guide rollers thereof bearing against the inclined strip is moved, during circulation of the endless conveyor track in the track conveying direction, in a diverting direction along the inclined strip and wherein the push shoe shown in FIG. 4 has already been displaced along the inclined strip to such an extent by its guide roller that it has arrived in the second recess of the inclined strip, through which this push shoe is moved over the inclined strip in the strip conveying direction.
Figure 6:
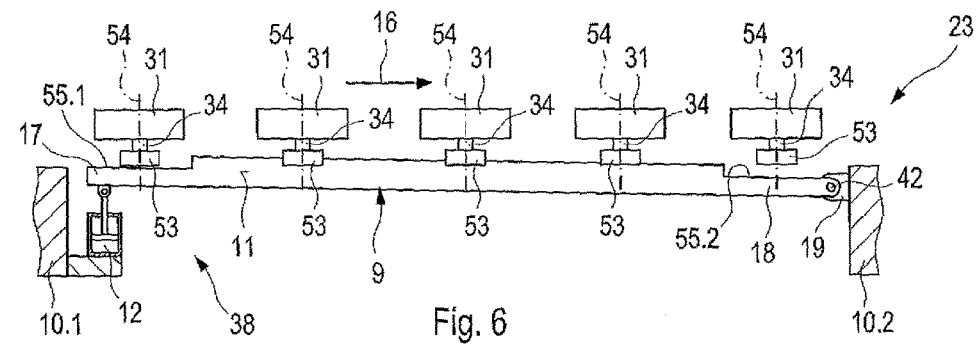
FIG. 6 shows a substantially simplified cross-section in the region of the upper run of the endless conveyor track of the sorting conveyor, wherein the illustrated inclined strip is disposed in an intermediate setting between the diverting engagement setting thereof and the lower free setting thereof, so that during circulation of the endless conveyor track in the track conveying direction the diverted push shoes still bearing by the guide rollers thereof against the inclined strip are further displaced until in the second recess, whilst a further push shoe newly arriving in front of the inclined strip is already further moved in the track conveying direction through the first recess of the inclined strip and over the inclined strip.

The mode of operation is as follows: If an item of piece goods 21 is to be diverted and ejected, then the actuator 12 is acted on by air or current. FIG. 5 shows the raised setting 14, which is also termed upper diverting engagement setting, of the blade 9. The shoe 31 with the roller 53 bearing against the blade 9 is now constrainedly moved by the blade 9 in direction 16. Depending on the length of the item of piece goods 21, a further shoe 31 or several further shoes 31 is or are laterally moved in direction 16 and during the forward movement, thus during the movement of the endless conveyor track 26 in the track conveying direction 24, eject the item of piece goods 21 laterally into the destination position 33 or 36.

Designated by destination position 33, 36 are ejection locations, preferably chutes, laterally of the conveyor 20. At the second end 18 of the blade 9 the shoe 31 can, due to the second recess 55.2 as can be seen in FIG. 5, continue to run linearly together with the endless conveyor belt 26 in the track conveying direction 24.

If ejection is to take place at the conveyor 20 only on one side then the shoes 31, after they have been constrainedly displaced in the diverting direction, can be brought back to the starting side by a stationary blade, which is not shown and which is arranged at, for example, the start of the conveyor 20, which blade for this purpose is arranged at the lower side 28—also termed lower run—of the conveyor transversely or perpendicularly to the raisable or lowerable blade 9.

FIG. 5 shows that the shoes 31 on reaching the second recess 55.2 are free and accordingly continue to move together with the endless conveyor belt 26 in longitudinal direction 24. Depending on the length of the item of piece goods 21, a defined number of shoes 31 is needed. When this number is achieved, the lifting station 12 moves downwardly to an intermediate setting 38 (see FIG. 6). The shoes 31 now arriving in front of the blade 9 can continue to run linearly in the track conveying direction 24, whereas the shoes 31 still bearing by means of the guide rollers 53 thereof against the blade 9 are further moved in terms of time along the blade 9 until these also reach the second recess 55.2.

Conveyors 20 of this kind are usually used for ejection to one side of the endless conveyor track 26, thus for ejection on one side. This is shown by way of example in FIGS. 2 and 15.

If, for example, destinations 33, 36 are to be moved to at both sides, then the blade technology can be used in crosswise form as illustrated in, in particular, FIGS. 9 to 14. Whereas the first blade 9.1 is continuous, the second blade 9.2 in the crossing region 43 has a cut-out 50 for the first blade 9.1 and is accordingly reinforced in the lower region.

The first stroke cylinder 12.1 for the first blade 9.1, which is also termed first double stroke cylinder, consists of two stroke cylinders connected together and, in particular, of a first first stroke cylinder 12.1.1 and a second first stroke cylinder 12.1.2. The second stroke cylinder 12.2 for the second blade 9.2, which is also termed second double stroke cylinder, similarly consists of two stroke cylinders connected together and, in particular, of a first second stroke cylinder 12.2.1 and a second second stroke cylinder 12.2.2.

The stroke cylinder 12.1.1 thus operates as described beforehand for the ejection on one side. The other stroke cylinder 12.1.2 is activated when the second blade 9.2 moves the shoes 31 laterally. In other words, when the first blade 9.1 moves the shoes 31 laterally in direction 33, the two cylinders 12.1.1 and 12.1.2 of the double stroke cylinder 12.1 are extended. The two stroke cylinders 12.1.1 and 12.1.2 are retracted when the number of necessary shoes 31 has been moved laterally in direction 33. If there is ejection in direction 36, the two stroke cylinders 12.1.1 and 12.1.2 are retracted so that the rollers 53, which bear against the second blade 9.2, of the push shoes 31 have a free passage at the crossing point 43, thus do not collide thereat with the first blade 9.1.

Figure 8:
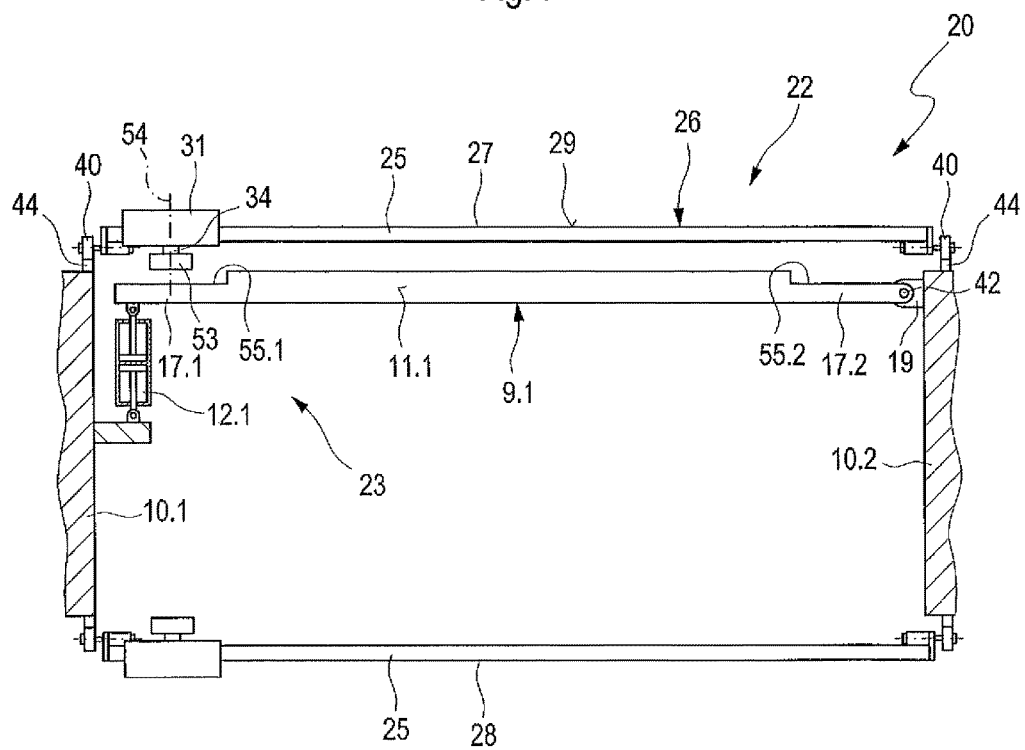
FIG. 8 shows a simplified cross-section in the region of the endless conveyor track, which is formed from track profile members, with an upper run and a lower run, for illustration of the mounting of a push shoe of the push shoes on a track profile member of the track profile members of the endless conveyor track and for illustration of the mounting of a track profile member of the track profile members of the endless conveyor track by way of guide rollers, which are mounted on the mutually remote ends of the respective track profile member, on guide rails which extend in the track conveying direction and are arranged on either side of the endless conveyor track to extend longitudinally thereof, with schematic illustration of a double stroke cylinder, which comprises two stroke cylinders, for raising and lowering the illustrated inclined strip.

Although the embodiment of the invention described in the preceding relates to ejection technology on both sides, for reasons of understanding only the first blade 9.1, one profile member 25 and one shoe 31 together with the roller 53 thereof are illustrated in the cross-section according to FIG. 8. The lateral cheek 44 of the frame construction and the guide rollers 40, which are attached to the respective profile member 25, for the endless conveyor track 26 formed from the profile members 25 are also illustrated in FIG. 8.

Figure 12:
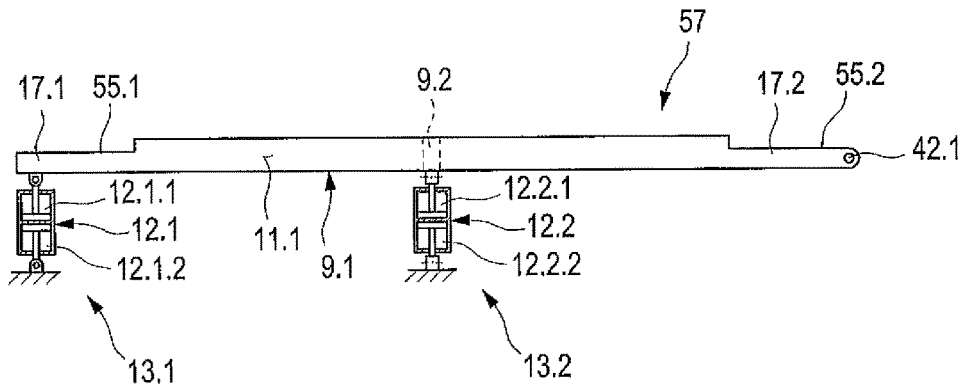
FIG. 12 shows a simplified illustration similar to FIG. 10 in which the first inclined strip and the second inclined strip are disposed in the respective lower, free setting (basic setting) thereof, in which all stroke cylinders are retracted.
Figure 13:
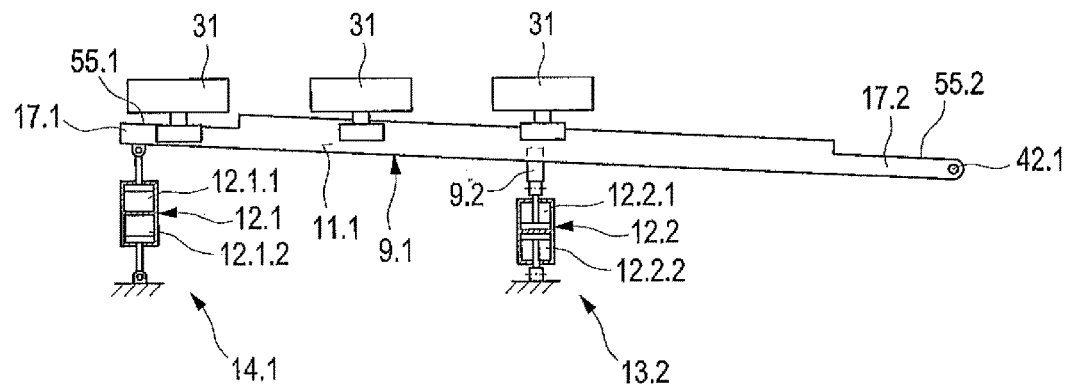
FIG. 13 shows a simplified illustration similar to FIG. 10 in which now the first inclined strip is disposed in its upper, diverted engagement setting, for which purpose a first first stroke cylinder and a second first stroke cylinder of a first double stroke cylinder are extended, wherein the second inclined strip is disposed as before in the lower free setting thereof in which a first second stroke cylinder and a second second stroke cylinder of a second double stroke cylinder are retracted.
Figure 14:
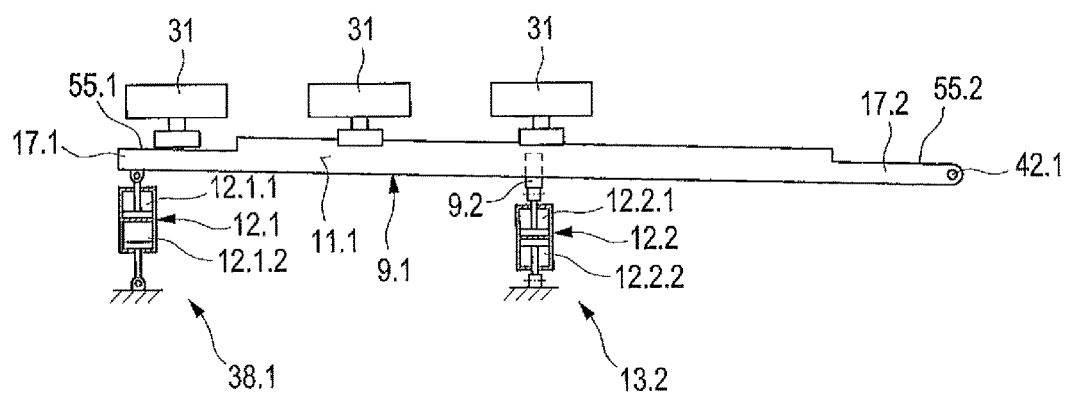
FIG. 14 shows a simplified illustration similar to FIG. 10 in which now the first inclined strip is disposed in an intermediate setting between the lower free setting thereof and the upper diverting engagement setting thereof, for which purpose, for example, the first first stroke cylinder remains extended and the second first stroke cylinder is retracted, whilst the second inclined strip is disposed as before in the lower free setting thereof in which the first second stroke cylinder and the second second stroke cylinder are retracted.

The mode of operation of the two double stroke cylinders 12.1 and 12.2 is illustrated in FIGS. 12 to 14 with reference to the first blade 9.1. In the basic setting 57 shown in FIG. 12 the two blades 9.1 and 9.2 are in the lower, free setting 13.1, 13.2 thereof. For that purpose, all stroke cylinders 12.1.1, 12.1.2; 12.2.1, 12.2.2 of the two double stroke cylinders 12.1 and 12.2 are retracted. In order to enable, starting from this basic setting 57, sorting or ejection of an item (not shown) of piece goods in the direction of the destination 33 by means of the guide rollers 53, which for that purpose bear against the first blade 9.1, of push shoes 31 provided for that purpose the two stroke cylinders 12.1.1 and 12.1.2 of the first double stroke cylinder 12.1 are extended, whereby the first blade 9.1 passes into its upper, diverting engagement setting 14.1 as illustrated in FIG. 13. During that, the second inclined strip 9.2 remains as before in its lower free setting 13.2 in which the two stroke cylinders 12.2.1 and 12.2.2 of the double stroke cylinder 12.2 are retracted.

If in this setting the desired number of push shoes 31 is diverted, here by way of example four push shoes 31, then either with the stroke cylinder 12.1.1 still extended the other stroke cylinder 12.1.2 of the double stroke cylinder 12.1 is retracted so that the stroke cylinder setting shown in FIG. 14 and thus a corresponding intermediate setting 12.1 of the first blade 9.1 between the upper, diverting engagement setting 14.1 thereof and the lower, free setting 13.1 thereof are achieved or with the stroke cylinder 12.1.2 still extended the stroke cylinder 12.1.1 of the double stroke cylinder 12.1 is retracted so that then the intermediate setting 12.1, which is similarly shown in FIG. 14, of the first blade 9.1 is achieved. In this intermediate setting 12.1 the push shoe 31 shown on the outside at the left in FIG. 14 can continue to move in the track conveying direction 24 without collision with the first blade 9.1 whilst at the same time the guide rollers 53, which still bear against the first blade 9.1, of the associated push shoes 31 continue to be moved along the first blade 9.1 until they pass through the second recess 55.2 of the first blade 9.1.

FIG. 15 shows a development in which an embodiment with parallel ejection is shown. In that case, several blades 9 are raised at the same time by a support 58, which can also be termed cross member. Individual shoes 31, which are displaced one behind the other in the track conveying direction 24 and parallel to the track conveying direction 24, move the item of piece goods 21 in parallel displacing movement in the diverting direction until in the destination location 33. It can also be seen in FIG. 15 how the item of piece goods 21 has arrived at the destination location 33. Depending on the respective size of the item of piece goods, preferably several blades 9 are connected together by way of the cross member 29. All blades 9 are then simultaneously raised or lowered by way of the stroke cylinder 12.

An alternative is equipping each blade 9 with a respective individual stroke cylinder 12, adaptation to different piece good lengths then being simpler.

Control of the stroke cylinder 12 or stroke cylinders 12.1, 12.2 is carried out with hardware and software belonging to the prior art and accordingly not described in more detail.

The invention embodies a decisive development through a strikingly simple diverting or ejection technology. The diverters known from the prior art can be completely eliminated and are replaced by at least one raisable and lowerable inclined strip 9, also called blade. In that case the at least one inclined blade 9 is raisable and lowerable at one end and has a respective recess 55.1, 55.2 at each of its two ends 17, 18. These measures are sufficient for reliable diversion or ejection. This is with much less cost than in the prior art.

In summary, the invention can also be illustrated as follows: Device 20 for conveying piece goods 21 along a conveying path 22, comprising a sorting device 23 for sorting piece goods 21, a plurality of track profile members 25, which extend transversely to a track conveying direction 24 and which are connected together to form an endless conveyor track 26 with an upper run 27 and a lower run 28, wherein the upper run 27 has a conveyor surface 29 for conveying the piece goods 21 in the track conveying direction 24, a plurality of push shoes 31, which are successive along the conveying path 22 and of which each push shoe 31 is displaceable along at least one track profile member 25 of the track profile members 25 so as to constrainedly displace the piece goods 21 laterally on the conveyor surface 29 transversely to the track conveying direction 24 of the endless conveyor track 26, and a drive 32 for driving the endless conveyor track 26 in the track conveying direction 24, wherein each push shoe 31 comprises a guide roller 53, which is arranged below the upper run 27 and which is mounted to be rotatable about an axis 54 of rotation extending transversely to the conveyor surface 29, and wherein arranged below the upper run 27 is at least one inclined strip 9, 9.1, 9.2, which is mounted preferably at one end to be raisable and lowerable, in particular pivotably mounted at one end, and which extends at an inclination to the track conveying direction 24 in one direction and is provided with a recess 55.1 or with at least two recesses 55.1, 55.2; 56.1, 56.2 for selectably allowing the guide roller 53 to pass, the recesses being arranged in the said direction at a spacing from one another. When the at least one inclined strip 9; 9.1, 9.2 is disposed in its raised diverting setting 14 and when the endless conveyor track 26 circulates in the track conveying direction 24, the push shoes 31 are constrainedly laterally displaced by means of the guide rollers 53 thereof below the upper run 37 through the inclined strip 9; 9.1, 9.2, which is raisable and lowerable preferably at one end.

Although only a few embodiments of the present invention have been shown and described, it is to be understood that many changes and modifications may be made thereunto without departing from the spirit and scope of the invention.

REFERENCE NUMERAL LIST 9 diverting guidance inclined body/inclined strip/blade
9.1 diverting guidance inclined body/inclined strip/blade
9.2 diverting guidance inclined body/inclined strip/blade
10.1 support/side cheek
10.2 support/side cheek
11 diverting guide surface
11.1 diverting guide surface
11.2 diverting guide surface
12 actuator/stroke cylinder/stroke station
12.1 actuator/stroke cylinder/stroke station/double stroke cylinder
12.1.1 actuator/stroke cylinder/stroke station
12.1.2 actuator/stroke cylinder/stroke station
12.2 actuator/stroke cylinder/stroke station/double stroke cylinder
12.1.2 actuator/stroke cylinder/stroke station
12.2.2 actuator/stroke cylinder/stroke station
13 (lower) free setting/pass setting/basic setting
13.1 (lower) free setting/pass setting/basic setting
13.2 (lower) free setting/pass setting/basic setting
14 (upper) diverting engagement setting/diverting setting/raised setting
14.1 (upper) diverting engagement setting/diverting setting/raised setting
16 diverting direction
16.1 direction/diverting direction
16.2 direction/diverting direction
17 first end of 9
17.1 first end of 9.1
17.2 second end of 9.1
18 second end of 9
18.1 first end of 9.2
18.2 second end of 9.2
19 rotary bearing/bearing block
19.1 (first) rotary bearing
19.2 (second) rotary bearing
20 device/entire conveyor
21 piece goods/conveyed goods
22 conveying path
23 (constrained displacement) sorting device
24 track conveying direction/main conveying direction
25 profile member/track profile/transverse profile member/aluminium profile member
26 endless conveyor track/conveyor
27 upper run of 26
28 lower run of 26
29 conveyor surface
31 shoe/push shoe/slide shoe/pushing-off shoe
32 drive/drive unit
33 destination/destination location/destination position/ejection location/chute
34 bearing body
35 rubber chain/endless rubber drive chain
36 destination/destination location/destination position/ejection location/chute
38 intermediate setting
38.1 intermediate setting
40 roller/guide roller
41 gearwheel/deflecting wheel/circulation station
42 axis of rotation of 19
42.1 axis of rotation of 19.1

42.2 axis of rotation of 19.2
43 crossing region
44 frame beam/support beam/support/side cheek
45 frame/structure
46 support
50 (receiving) cut-out (in crossing region)
51.1 (first) guide track/track
51.2 (second) guide track/track
52.1 diverting guide track/ejection track/track
52.2 diverting guide track/ejection track/track
52.3 diverting guide track/ejection track/track
53 (guide) roller
54 axis of rotation of 53
55.1 (first) recess
55.2 (second) recess
56.1 (first/third) recess
56.2 (second/fourth) recess
57 basic setting
58 cross member/support
59.1 (first) recess spacing
59.2 (second) recess spacing
60 entry slope/entry curve
70 geared motor

What is claimed is:

1. A device for conveying piece goods along a conveying path, comprising
a sorting device for sorting piece goods,
a plurality of track profile members, which extend transversely to a track conveying direction and which are connected together to form an endless conveyor track with an upper run and a lower run, wherein the upper run of the endless conveyor track has a conveyor surface for conveying the piece goods in the track conveying direction,
a plurality of push shoes, which are successive along the conveying path and each of which is displaceable along at least one track profile member of the track profile members so as to constrainedly displace the piece goods laterally on the conveyor surface transversely to the track conveying direction of the endless conveyor track, and
a drive for driving the endless conveyor track in the track conveying direction,
wherein each push shoe comprises a guide roller, which is arranged below the upper run and rotatable about an axis of rotation extending transversely or perpendicularly to the conveyor surface and which is mounted on a bearing body, for guidance of the push shoe, during circulation of the endless conveyor track in the track conveying direction, along at least one guide track extending parallel to the track conveying direction and along at least one diverting guide track extending at an inclination to the track conveying direction,
wherein the at least one diverting guide track is formed by a first diverting guidance inclined body arranged below the upper run,
wherein a first actuator for actuating the first diverting guidance inclined body is provided and
wherein the first diverting guidance inclined body is transferrable via the first actuator from a first pass setting, in which the push shoes can move in the track conveying direction during circulation of the endless conveyor track in the track conveying direction, to a first diverting setting in order to be able to move the push shoes, during circulation of the endless conveyor track in the track conveying direction, in a first diverting direction at an inclination to the track conveying direction along the at least one diverting guide track,
wherein the endless conveyor track as considered in a direction perpendicular to the track conveying direction has a width and wherein the first diverting guidance inclined body has a first length corresponding with at least half or at least two-thirds of the width of the endless conveyor track,
wherein
the first actuator is so arranged and constructed that it can raise the first diverting guidance inclined body from a first, lower free setting in a direction transverse or perpendicular to the conveyor surface to a first, upper diverting engagement setting and the first diverting guidance inclined body is so mounted that it is raisable and lowerable in a direction transverse or perpendicular to the conveyor surface and is transferrable via the first actuator from the first, lower free setting, in which the push shoes can move together with the guide rollers thereof, during circulation of the endless conveyor track in the track conveying direction, above the first diverting guidance inclined body and across the first diverting guidance inclined body in the track conveying direction, to the first, upper diverting engagement setting, in which the guide rollers of the push shoes to be diverted contact, during circulation of the endless conveyor track in the track conveying direction, a first diverting guide surface of the first diverting guidance inclined body so that the push shoes to be diverted are moved, when they bear by the guide rollers thereof against the first diverting guide surface of the first diverting guidance inclined body, during circulation of the endless conveyor track in the track conveying direction, along the first diverting guide surface of the first diverting guidance inclined body in the first diverting direction at an inclination to the track conveying direction.

2. The device according to claim 1, wherein the first diverting guidance inclined body has at its upper side facing the upper run a first recess which opens upwardly in direction towards the upper run and is formed in such a way
that at least one guide roller part of the guide roller of each push shoe is receivable in the first recess
so that when the first diverting guidance inclined body is in a first intermediate setting between the first, lower free setting and the first, upper diverting engagement setting
and when the endless conveyor track moves in the track conveying direction
the guide roller part of the guide roller of each push shoe which is not to be diverted can move in the track conveying direction along a first guide track, which extends in the track conveying direction, for guidance of the push shoes through the first recess of the first diverting guidance inclined body and across the first diverting guidance inclined body
and/or
wherein the first diverting guidance inclined body has at its upper side facing the upper run a second recess which is upwardly open in direction towards the upper run and formed in such a way
that at least a guide roller part of the guide roller of each push shoe diverted via the first diverting guidance inclined body is receivable in the second recess
so that when the first diverting guidance inclined body is in its first, upper diverting engagement setting and when the endless conveyor track moves in the track conveying direction the guide roller part of the guide roller of each push shoe diverted via the first diverting guidance inclined body can move in the track conveying direction along a second guide track, which extends in the track conveying direction, for guidance of the push shoes through the second recess of the first diverting guidance inclined body and across the first diverting guidance inclined body.

3. The device according to claim 2, wherein the first recess of the first diverting guidance inclined body and the second recess of the first diverting guidance inclined body as considered in a direction inclined with respect to the track conveying direction are arranged at a first recess spacing from one another and wherein the first guide track and the second guide track extend parallel to one another in the track conveying direction and have in the said direction a guide track spacing from one another corresponding with the first recess spacing.

4. The device according to claim 1, wherein the first diverting guidance inclined body has a first end and a second end facing away therefrom, the first recess of the first diverting guidance inclined body is arranged at the first end of the first diverting guidance inclined body and/or the second recess of the first diverting guidance inclined body is arranged at the second end of the first diverting guidance inclined body.

5. The device according to claim 4, wherein the first end of the first diverting guidance inclined body as considered in a cross-section containing a longitudinal axis of the first diverting guidance inclined body is formed to be step-shaped and/or the second end of the first diverting guidance inclined body as considered in a or the cross-section containing a longitudinal axis of the first diverting guidance inclined body is formed to be step-shaped.

6. The device according to claim 4, wherein the first end of the first diverting guidance inclined body has a first entry slope or entry curve for the guide rollers.

7. The device according to claim 1, wherein the first diverting guidance inclined body in the region of one end of its ends facing away from one another or at one end of its ends facing away from another or in the region of the second end or at the second end is so articulated via a first pivot bearing or rotation bearing to a first support for the first diverting guidance inclined body to be either pivotable about a pivot axis, which extends parallel or at an acute angle to the conveyor surface, or rotatable about an axis of rotation, which extends parallel or at an acute angle to the conveyor surface, relative to the first support and in a direction transverse to the conveyor surface relative to the conveyor surface wherein the first diverting guidance inclined body is pivotable or rotatable via the first actuator from the first, lower free setting about the first pivot axis or about the first axis of rotation in a direction transverse to the conveyor surface to the first, upper diverting engagement setting.

8. The device according to claim 1, wherein the at least one diverting guide track is formed by a second diverting guidance inclined body arranged below the upper run and wherein either a second actuator for actuation of the second diverting guidance inclined body is provided and the second diverting guidance inclined body is transferrable via the second actuator from a second pass setting in which the push shoes, during circulation of the endless conveyor track in the track conveying direction, can move in the track conveying direction to a second diverting setting in order to be able to move the push shoes, during circulation of the endless conveyor track in the track conveying direction, in a second diverting direction at an inclination to the track conveying direction along the at least one diverting guide track, wherein the second actuator is so arranged and constructed wherein it can raise the second diverting guidance inclined body from a second, lower free setting in a direction transverse or perpendicular to the conveyor surface to a second, upper diverting engagement setting, or the first actuator also serves for actuation of the second diverting guidance inclined body, and wherein the second diverting guidance inclined body is so mounted that it is raisable and lowerable in a direction transverse or perpendicular to the conveyor surface and is transferrable via the first or second actuator, from the second, lower free setting, in which the push shoes together with the guide rollers thereof, during circulation of the endless conveyor track in the track conveying direction, can move above the second diverting guidance inclined body and across the second diverting guidance inclined body in the track conveying direction to the second, upper diverting engagement setting, in which the guide rollers of the push shoes to be diverted, during circulation of the endless conveyor track in the track conveying direction, can or do contact a second diverting guide surface of the second diverting guidance inclined body so that the push shoes to be diverted are moved, when they bear by the guide rollers thereof against the second diverting guide surface of the second diverting guidance inclined body, during circulation of the endless conveyor track in the track conveying direction, along the second diverting guide surface of the second diverting guidance inclined body in the second diverting direction at an inclination to the track conveying direction.

9. The device according to claim 8, wherein the second diverting guidance inclined body has at the upper side thereof facing the upper run a third recess which is upwardly open in direction towards the upper run and which is so formed that at least a guide roller part of the guide roller of each push shoe is receivable in the third recess so that when the second diverting guidance inclined body is in a second intermediate setting between the second, lower free setting and the second, upper diverting engagement setting and when the endless conveyor track moves in the track conveying direction the guide roller part of the guide roller of each push shoe not to be diverted can move or moves in the track conveying direction along the first guide path, which extends in the track conveying direction, for guidance of the push shoes through the third recess of the second diverting guidance inclined body and across the second diverting guidance inclined body and/or wherein the second diverting guidance inclined body at the upper side thereof facing the upper run has a fourth recess which is upwardly open in direction towards the upper run and is so formed that at least a guide roller part of the guide roller of each push shoe diverted via the second diverting guidance inclined body is receivable in the fourth recess so that when the second diverting guidance inclined body is in its second, upper diverting engagement setting and when the endless conveyor track moves in the track conveying direction the guide roller part of the guide roller of each push shoe diverted via the second diverting guidance inclined body can move in the track conveying direction along the second guide track, which extends in the track conveying direction, for guidance of the push shoes through the fourth recess of the second diverting guidance inclined body and across the second diverting guidance inclined body.

10. The device according to claim 8, wherein the third recess of the second diverting guidance inclined body and the fourth recess of the second diverting guidance inclined body as considered in a direction inclined with respect to the track conveying direction are arranged at a second recess spacing from one another and wherein the first guide track and the second guide track extend parallel to one another in the track conveying direction and have in the said direction a guide track spacing from one another corresponding with the second recess spacing.

11. The device according to claim 8, wherein the second diverting guidance inclined body has a first end and a second end facing away therefrom, the third recess of the second diverting guidance inclined body is arranged at the first end of the second diverting guidance inclined body and/or the fourth recess of the second diverting guidance inclined body is arranged at the second end of the second diverting guidance inclined body.

12. The device according to 11, wherein the first end of the second diverting guidance inclined body as considered in a cross-section containing a longitudinal axis of the second diverting guidance inclined body is formed to be step-shaped and/or the second end of the second diverting guidance inclined body as considered in a cross-section containing a longitudinal axis of the second diverting guidance inclined body is formed to be step-shaped.

13. The device according to claim 11, wherein the first end of the second diverting guidance inclined body has a second entry slope or entry curve for the guide rollers.

14. The device according to claim 8, wherein the second diverting guidance inclined body in the region of one end of its ends facing away from one another or at one end of its ends facing away from one another or in the region of the second end or at the second end is so articulated via a second pivot bearing or rotation bearing to a second support for the second diverting guidance inclined body to be either pivotable about a pivot axis, which extends parallel or at an acute angle to the conveyor surface, or about an axis of rotation, which extends parallel or at an acute angle to the conveyor surface, relative to the second support and in a direction transverse or perpendicular to the conveyor surface relative to the conveyor surface that the second diverting guidance inclined body is pivotable or rotatable via the second actuator from the second, lower free setting about the second pivot axis or about the second axis of rotation in a direction transverse or perpendicular to the conveyor surface to the second, upper diverting engagement setting.

15. The device according to claim 8, wherein the first diverting guidance inclined body and the second diverting guidance inclined body are so arranged that they enable diversion or ejection of piece goods towards the same side of the endless conveyor track.

16. The device according to claim 15, wherein the first diverting guidance inclined body and the second diverting guidance inclined body are arranged to be parallel and at a spacing one behind the other as considered in the track conveying direction.

17. The device according to claim 15, wherein the first diverting guidance inclined body and the second diverting guidance inclined body are coupled with a common support which together with the first diverting guidance inclined body and the second diverting guidance inclined body is at least raisable via the first actuator so as to enable or cause diversion or ejection of piece goods at one side.

18. The device according to claim 8, wherein the second diverting inclined guidance body has a second length corresponding with at least half or at least two-thirds of the width of the endless conveyor track.

19. The device according to claim 1, wherein the first diverting guidance inclined body and the second diverting guidance inclined body are so arranged that they enable diversion or ejection of piece goods towards, as considered in a direction perpendicular to the track conveying direction, sides of the endless conveyor track facing away from one another.

20. The device according to claim 1, wherein the first diverting guidance inclined body and the second diverting guidance inclined body are of the same form.

21. The device according to claim 1, wherein the first diverting guidance inclined body and the second diverting guidance inclined body are arranged to cross and thereby form a crossing region.

22. The device according to claim 21, wherein the first diverting guidance inclined body in the crossing region has a first receiving recess in which a part of the second diverting guidance inclined body is received to be raisable and lowerable relative to the first diverting guidance inclined body or wherein the second diverting guidance inclined body in the crossing region has a second receiving recess in which a part of the first diverting guidance inclined body is received to be raisable and lowerable relative to the second diverting guidance inclined body (9.2).

23. The device according to claim 22, wherein the first diverting guidance inclined body and the second diverting guidance inclined body are of the same form apart from the crossing region.

24. The device according to claim 1, wherein the first diverting guidance inclined body and/or the second diverting guidance inclined body is or are arranged at an angle to the track conveying direction, the angle being 45 degrees or smaller than 45 degrees or being 30 degrees.

25. The device according to claim 1, wherein the first actuator comprises a first first actuator and a second first actuator actuable independently of one another, wherein an actuator part of the first first actuator is actuable in a first lower end position and in a first upper end position, the end position spacing of which corresponds with a first total stroke of the first first actuator, wherein an actuator part of the second first actuator is actuable in a second lower end position and in a second upper end position, the end position spacing of which corresponds with a second total stroke of the second first actuator, and wherein the first first actuator and the second first actuator are so coupled together that the first lower free setting is achieved in the first upper end position of the actuator part of the first first actuator in combination with the first lower end position of the actuator part of the second first actuator, wherein the first upper diverting engagement setting is achieved in the first lower end position of the actuator part of the first first actuator in combination with the first upper end position of the actuator part of the second first actuator and wherein the first intermediate setting is achieved either in the first lower end position of the actuator part of the first first actuator in combination with the second lower end position of the actuator part of the second first actuator or in the first upper end position of the actuator part of the first first actuator in combination with the second upper end position of the actuator part of the second first actuator and/or wherein the second actuator comprises a first second actuator and a second second actuator actuable independently of one another, wherein an actuator part of the first second actuator is actuable in a first lower end position and in a first upper end position, the end position spacing of which corresponds with a first total stroke of the first second actuator, wherein an actuator part of the second second actuator is actuable in a second lower end position and in a second upper end position, the end position spacing of which corresponds with a second total stroke of the second second actuator, and wherein the first second actuator and the second second actuator are so coupled together that the second lower free setting is achieved in the second upper end position of the actuator part of the first second actuator in combination with the second lower end position of the actuator part of the second second actuator, wherein the second upper diverting engagement setting is achieved in the second lower end position of the actuator part of the first second actuator in combination with the second upper end position of the actuator part of the second second actuator and wherein the second intermediate setting is achieved either in the second lower end position of the actuator part of the first second actuator in combination with the second lower end position of the actuator part of the second second actuator or in the second upper end position of the actuator part of the first second actuator in combination with the second upper end position of the actuator part of the second second actuator.

26. The device according to claim 1, wherein the first diverting guidance inclined body is constructed as an elongate inclined strip and/or wherein the second diverting guidance inclined body is constructed as an elongate inclined strip.

27. A method of sorting piece goods via the sorting device of the device for conveying piece goods according to claim 1, the method comprising:
  circulating the endless conveyor track driven by the drive circulates in the path conveying direction,
  resting at least one item of piece goods on the conveyor surface so that the at least one item of piece goods and a plurality of the push shoes successive along the conveying path are moved in the track conveying direction,
  for diversion or ejection of the at least one item of piece goods in the first diverting direction, moving via the first actuator the first diverting guidance inclined body from the first lower free setting to the first upper diverting engagement setting, and
  contacting the guide rollers of the push shoes with the first diverting guide surface of the first diverting guidance inclined body so that then each guide roller, which bears against the first diverting guide surface of the first diverting guidance inclined body, of the respective push shoe is moved, during circulation of the endless conveyor track in the track conveying direction, along the first diverting guide surface of the first diverting guidance inclined body in the first diverting direction at an inclination to the track conveying direction, whereby a constrained displacement of the respective push shoe and as a consequence also a constrained displacement of the at least one item of piece goods via the respective push shoe transversely to the track conveying direction is achieved.

28. The method according to claim 27, wherein the first diverting guidance inclined body in the region of one end of its ends facing away from one another or at one end of its ends facing away from one another is articulated via a first pivot bearing or rotation bearing to a first support for the first diverting guidance inclined body to be either pivotable about a first pivot axis, which extends parallel or at an acute angle to the conveyor surface, or rotatable about a first axis of rotation, which extends parallel or at an acute angle to the conveyor surface, relative to the first support and in a direction transverse to the conveyor surface relative to the conveyor surface, and
  wherein the first diverting guidance inclined body is pivoted or rotated via the first actuator from the first, lower free setting about the first pivot axis or about the first axis of rotation in a direction transverse to the conveyor surface to the first, upper diverting engagement setting.

29. The method according to claim 27, wherein the first diverting guidance inclined body has at the upper side thereof facing the upper run not only a first recess, but also a second recess which as considered in a direction inclined with respect to the track conveying direction are arranged at a first recess spacing from one another and which are each upwardly open in direction towards the upper run and formed in such a way that at least a guide roller part of the guide roller of each push shoe is receivable in the first recess and in the second recess, and
  wherein as soon as the guide roller part of a guide roller of a diverted push shoe has arrived in the second recess so that then the guide roller part of this guide roller can move in the track conveying direction through the second recess and across the first diverting guidance inclined body the first diverting guidance inclined body is so lowered via the first actuator or via a further actuator into a first intermediate setting between the first, upper diverting engagement setting and the first, lower free setting, and
  wherein the guide rollers, which still bear against the first diverting guide surface of the first diverting guidance inclined body, of the push shoe to be diverted are moved, during circulation of the endless conveyor track in the conveying direction, further along the first diverting guide surface of the first diverting guidance inclined body at an inclination with respect to the track conveying direction, whilst at the same time the guide roller of at least one further push shoe, which is moved in the track conveying direction and which impinges on the first diverting guidance inclined body, is already further moved in the track conveying direction through the first recess and across the first diverting guidance inclined body.

30. The method according to claim 27, wherein the at least one item of piece goods has a defined piece goods length, and
  wherein the sorting device is so controlled in dependence on the piece goods length of the at least one item of piece goods that via the first diverting guidance inclined body a defined number of the push shoes is constrainedly displaced transversely to the track conveying direction.

* * * * *